United States Patent [19]

Mori

[11] 4,409,963
[45] Oct. 18, 1983

[54] SOLAR OPTICAL ENERGY COLLECTOR

[76] Inventor: Kei Mori, 3-16-3-501, Kaminoge, Setagaya-ku, Tokyo, Japan

[21] Appl. No.: 276,537

[22] Filed: Jun. 23, 1981

[30] Foreign Application Priority Data

Jun. 27, 1980 [JP] Japan ............... 55-087277
Jun. 27, 1980 [JP] Japan ............... 55-087279

[51] Int. Cl.³ .............................................. F24J 3/02
[52] U.S. Cl. .................................... 126/440; 126/424; 350/452
[58] Field of Search ............... 126/440, 424, 425, 417, 126/443, 450, 438, 439; 350/409, 452, 482, 483

[56] References Cited

U.S. PATENT DOCUMENTS

| | | | |
|---|---|---|---|
| 1,683,266 | 9/1928 | Shipman | 126/440 |
| 3,493,291 | 2/1970 | Webb | 126/440 |
| 3,998,204 | 12/1976 | Fuchs et al. | 126/440 |
| 4,026,267 | 5/1977 | Coleman | 126/440 |
| 4,043,315 | 8/1977 | Cooper | 126/440 |
| 4,056,093 | 11/1977 | Barger | 126/440 |
| 4,057,048 | 11/1977 | Maine | 126/440 |
| 4,136,670 | 1/1979 | Davis | 126/440 |
| 4,205,661 | 6/1980 | Chapman | 126/440 |
| 4,267,823 | 5/1981 | Bohg et al. | 126/440 |
| 4,282,858 | 8/1981 | Bowers | 126/440 |

*Primary Examiner*—Daniel J. O'Connor
*Attorney, Agent, or Firm*—Merchant, Gould, Smith, Edell, Welter & Schmidt

[57] ABSTRACT

A solar optical energy collector having a lens system for concentrating sun beams and a sun beams receiving system for introducing said sun beams being concentrated into a optical-conductor cable.

In order to obtain the most effective arrangement of the lens system, said lens system comprises a plurality (N) of Fresnel lenses (1, 1. . . ) each formed in the shape of a hexagon, i.e. $N=3n(+1)$ Fresnel lenses (1, 1. . . ) are disposed around one Fresnel lens (1) so that each side of the one Fresnel lens (1) positioned in the center of the lens system adjoins to one side of each respective surrounding Fresnel lenses (1, 1. . . ) in a concentric-circular relationship, wherein (n) stands for a natural number.

4 Claims, 4 Drawing Figures

SOLAR OPTICAL ENERGY COLLECTOR

The present invention relates to an improvement of a solar optical energy collector. More particularly, the present invention relates to a novel arrangement of Fresnel lenses which are mounted on the collector for collecting solar energy and which can collect sun beams at the highest efficency and the most stable condition.

Recently, energetic developments and research have been made in various fields for effective utilization of solar energy with a view to meeting the requirement of saving energy. The present invention belongs to one of the above developments and research utilizing the radiative energy of the sun.

Many attempts have heretofore been proposed to obtain an optimum arrangement of Fresnel lenses mounted on a solar optical energy collector which can collect sun beams at the highest efficiency and at the most stable condition. However, such an optimum arrangement of Fresnel lenses was not achieved until the present. Furthermore, the construction of a solar optical energy collector is apt to become large. Therefore, in the prior techniques, it was quite difficult to prevent the influence of the wind upon said collector and to operate the collector smoothly and precisely to track the movement of the sun.

The invention as claimed is intended to overcome the aforementioned defect of the prior techniques. It solves the problems, firstly, by providing a novel arrangement of Fresnel lenses, each lens having the shape of a hexagon, arranged in a concentric-circular relationship; secondly, by using a transparent spherical capsule which hermetically includes Fresnel lenses; and thirdly, by turnably mounting the Fresnel lenses around two axes perpendicularly intersecting with each other at the centroid of the Fresnel lenses.

The advantages offered by the present invention are that a plurality of Fresnel lenses can be disposed without gaps therebetween and can form a big circular surface for sun beam concentrating as a whole, which results in providing the most effective arrangement of the Fresnel lenses. In addition, the influence from the wind can be prevented, and gyrating mass of the Fresnel lenses may be reduced to a minimum. Therefore, according to the present invention, the operation for tracking the movement of the sun can be performed very quickly and smoothly.

The way of carrying out the present invention is described in detail below with reference to several drawings which illustrate specific embodiments, in which.

Figure 3:
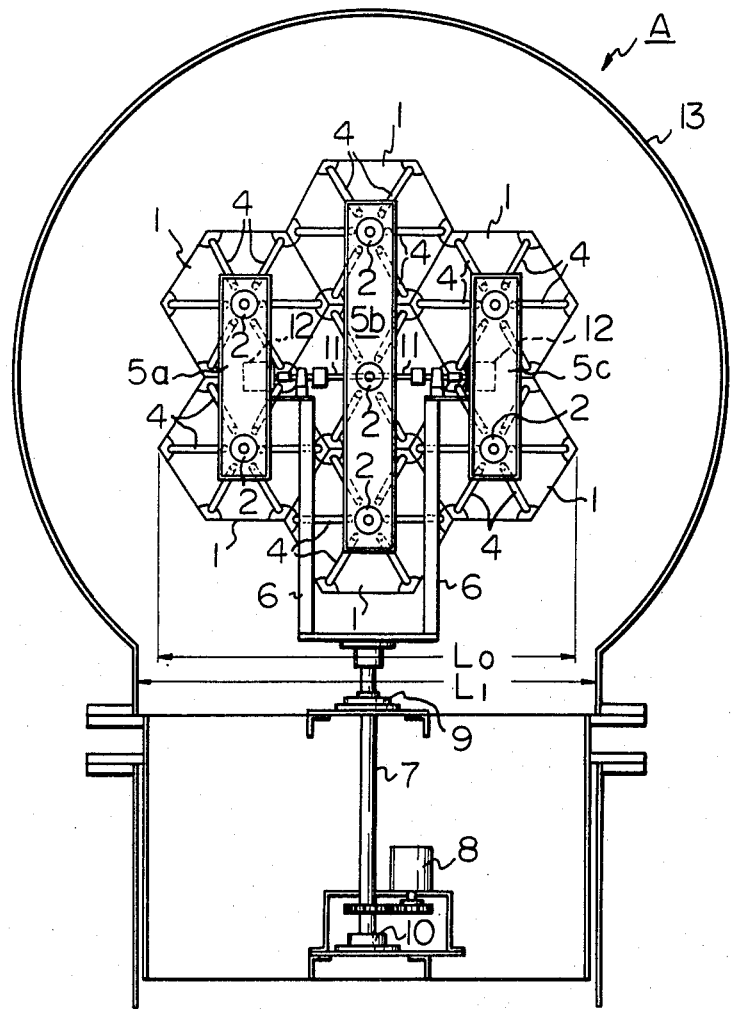
Figure 4:
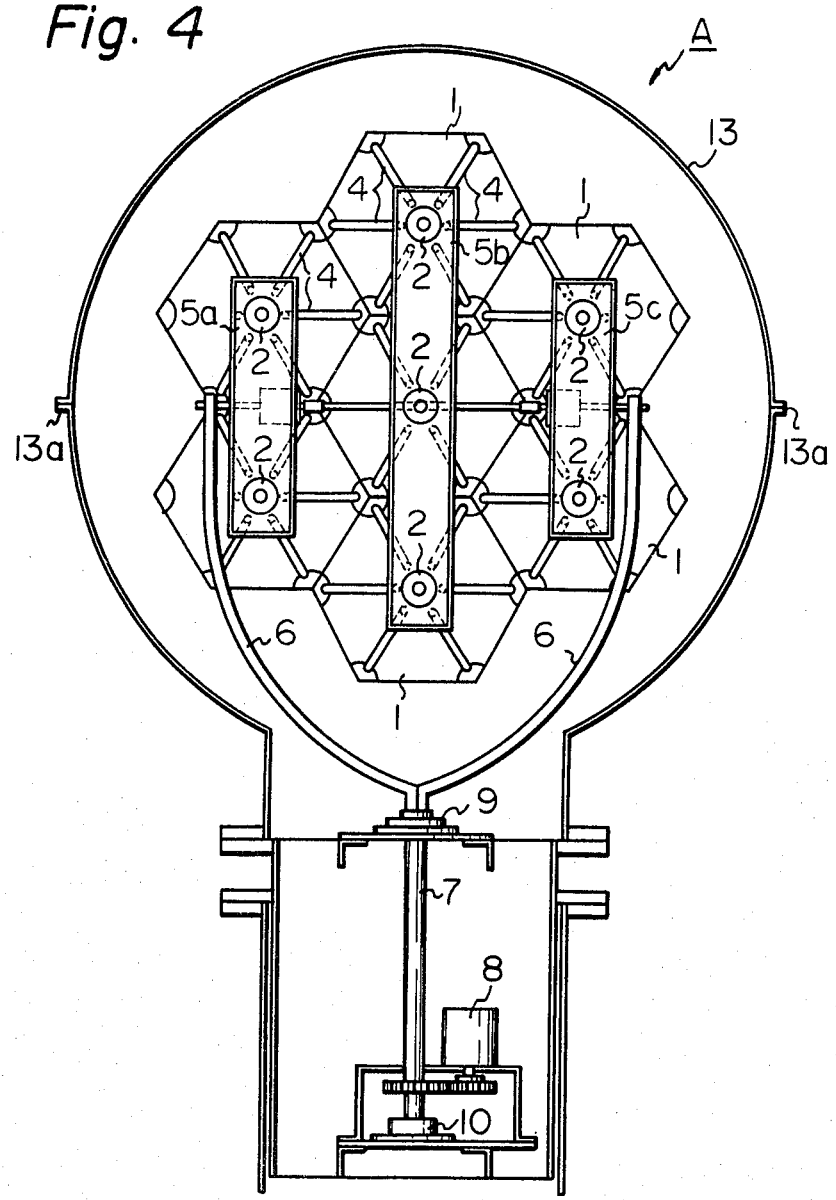

and FIG. 4 is a rear elevation, similar to FIG. 3, of an alternate embodiment of the solar optical energy collector according to the present invention:

Referring to the drawings in detail, wherein like numerals indicate like elements, there is shown a solar optical energy collector in accordance with the present invention designated generally as symbol A. Solar optical energy collectors are mounted generally on the roof of a building (not shown). The building may be of any type, however, solar optical energy collectors are especially suitable for use on residential homes.

The basic components of the solar optical energy collector include a Fresnel lens system for concentrating sun beams and a sun beam receiving system for introducing said sun beams being concentrated into an optical-conductor cable.

Figure 1:
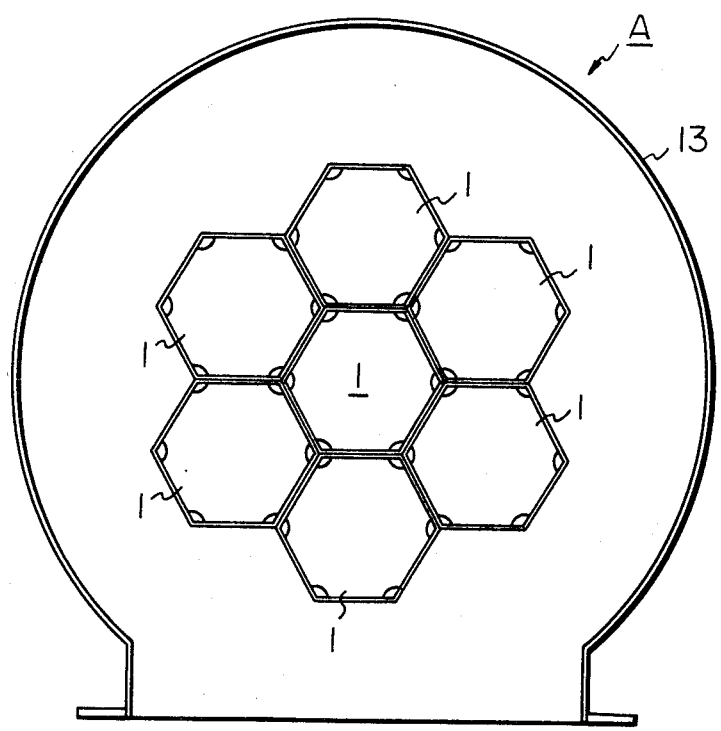
FIG. 1 is a front elevation diagrammatically illustrating the structure of one embodiment of the solar optical energy collector according to the present invention.
Figure 2:
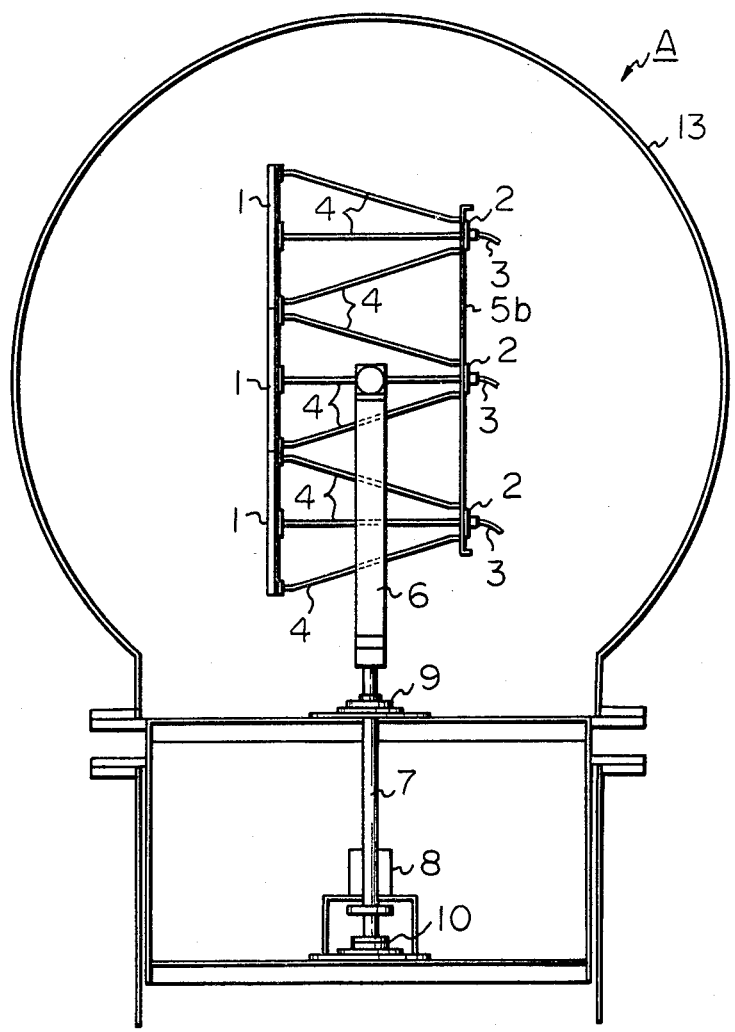
FIGS. 2 and 3 are side and rear elevation views, respectively of FIG. 1.

Referring to FIGS. 1 through 3, the reference numeral 1 represents a Fresnel lens formed of a light transparent material, such as plastic or glass, used to concentrate sun beams. As shown in FIG. 1, a Fresnel lens 1 formed in the shape of a hexagon placed in the center of the capsule. A plurality of Fresnel lenses 1, 1 . . . , also formed in the shape of hexagons are disposed around said one central Fresnel lens 1 so that each side of said Fresnel lens 1 positioned in the center adjoins to one side of each of the respective surrounding Fresnel lenses 1, 1 . . . . As a result, seven Fresnel lenses in all are utilized. The Fresnel lenses forming the lens system are quite the same in their dimensions and are made with same material. In the rearward side of each Fresnel lens 1 sun beam focusing members 2, 2 . . . forming the receiving system are disposed at regular intervals from the Fresnel lenses, respectively. Said sun beam focusing member 2 are intended to focus sun beams which are concentrated by means of the Fresnel lenses 1.

The sun beams received by said sun beam focusing members 2, 2 . . . are guided to a desired position (not shown in the drawings) through optical-conductor cables 3, 3 . . . , and then they are directly used as illuminating rays or they are utilized after they have been converted to electric energy, thermal energy or the like.

As shown in FIGS. 2 and 3, the Fresnel lenses 1 and the sun beam focusing members 2 are integrally connected with each other by connecting rods 4. Holding plates 5a, 5b and 5c are respectively provided to fix said lens and receiving systems. Reference numerals 6, 7, 8, 9 and 10 respectively represent supporting arms, which are connected to the holding plates 5a and 5c, a turnable vertical shaft, a vertical motor, a radial bearing and a thrust bearing. The above mentioned lens and receiving systems are supported by the vertical shaft 7 through the supporting arms 6, and can be turned around the axis of the vertical shaft 7. Reference numerals 11 and 12 represent a turnable horizontal shaft and a horizontal motor, respectively. Said horizontal motor 12 is provided on the holding plate 5a and or 5c so as to turn the lens and receiving systems around the axis of the horizontal shaft 11.

As a result of the above mentioned construction, the operation of causing the Fresnel lenses to automatically track the movement of the sun so as to effectively collect solar energy, can be performed by detecting the position of the sun by means of the detecting device (not shown), and by controlling the vertical and horizontal motors 8 and 12 in accordance with the output signals produced by said detecting device.

Although the invention has been described with respect to an embodiment provided with seven Fresnel lenses, it is to be understood that the present invention is not limited to said specific embodiment. For example, in addition to the embodiment illustrated in FIGS. 1 through 3, additional twelve Fresnel lenses can be disposed around the seven Fresnel lenses so that the number of Fresnel lenses amounts to nineteen in all. Still further, in addition to the above, another eighteen Fresnel lenses can be disposed around the nineteen Fresnel lenses, so that the number of Fresnel lenses amounts to thirty-seven in all. In a general sense, the constructive number N of the Fresnel lenses according to the present invention can be derived from the following equation:

$$N = 3n(n+1) + 1$$

wherein n stands for a natural number.

As stated above, according to the present invention, a plurality of hexagonal Fresnel lenses, which can be disposed without gaps therebetween, acts as a single lens having a configuration similar to a circle and thus a high efficiency of solar energy concentration is achieved. As the whole concentrating surface of the lens system is substantially a big circle, the present invention results in the most effective arrangement of the Fresnel lenses. In addition, since the individual Fresnel lens 1 has the focusing member 2, respectively, the focal distance of this lens system becomes remarkably shorter than that of the conventional lens system with a single big Fresnel lens. Consequently, the present invention provides a very compact solar optical energy collector.

As can been seen in FIGS. 2 and 3, the lens system together with the receiving system are hermetically sealed in a transparent spherical capsule 13, so as to prevent the influence of the wind upon the latter. Since the lens system and the receiving system are sealed against the surroundings, dust or chemical substances sticking to the lens system and disturbance of the automatic sun tracking operation by wind are completely prevented. Therefore, the lens system will not be polluted and efficiency will not be lowered by such substances, nor its collecting efficiency be reduced. In the Temperate Zone, the temperature within the capsule 13 does not rise so much. This is because the capsule 13 has a big radiating surface per se, and the collected solar optical energy is transported by means of the optical-conductor cable 3, and the remaining solar energy which has failed to impinge on the lens system will pass through the transparent capsule 13 toward the surroundings, therefore, solar energy is not accumulated within the capsule 13. Contrary to the above, in the Torrid or Frigid Zone, the temperature within the capsule should be controlled.

Furthermore, according to the present invention, the lens system together with the receiving system are turnably mounted around the vertical and horizontal shafts 7 and 11 perpendicularly intersecting with each other at the centroid of integrated both systems, so as to minimize gyrating mass of said integrated both systems. Said centroid of integrated both systems is substantially positioned at the center of said spherical capsule 13. The operation of automatically tracking the movement of the sun can be performed very quickly and smoothly. Since the axis 7 and 11 respectively pass through the centroid of integrated both of said systems, the Fresnel lenses can collect solar energy uniformly. The gyration torque thereof can be reduced to a minimum, and the responding action of the solar optical energy collector can be effected quickly.

In view of the fact that the turning angle of the lens system extends over 360°, the solar optical energy collector of the present invention may be utilized, for example, in either the Northern or Southern hemisphere. Also, when said collector is mounted on ships or the like, the collector can be utilized without any trouble, as the direction of the bow of said ship, on which the solar optical energy collector is usually mounted, can be entirely disregarded.

FIG. 4 is a rear elevation showing an alternate embodiment of the present invention. As can be seen from the drawing, the capsule 13 is divided along a horizontal plane 13a—13a passing substantially through the center thereof.

In the case of the embodiment shown in FIGS. 1 through 3, the inlet diameter $L_1$ of the spherical capsule 13 should be designed larger than the maximum width $L_0$ of the lens system, so as to receive the lens system et al within said spherical capsule. Thus, the diameter of such spherical capsule 13 becomes considerably large in size.

Contrary to the above, according to the alternate embodiment shown in FIG. 4, the diameter of the spherical capsule 13 can be sufficiently designed with a slightly larger diameter than the maximum width $L_0$ of the lens system. Consequently, the spherical capsule 13 of FIG. 4 becomes smaller in comparison with that of FIGS. 1 through 3. Furthermore, since the assembling and maintenancing operations of the collector can be performed after the upper half of the spherical capsule 13 has been removed, said operations are quite easy. Manufacturing of the collector is also easy.

The invention has been described in detail with particular reference to preferred embodiments thereof, but it will be understood that reasonable variations and modifications are possible without departing from the spirit and scope of the invention.

I claim:

1. A solar optical energy collector, comprising a lens system for concentrating sun beams and a sun beam receiving system for introducing said sun beams into an optical-conductor cable, said lens system having a plurality (N) of Fresnel lenses (1, 1 ...) each formed in the shape of a hexagon, with $N = 3n(n+1)$ Fresnel lenses (1, 1 ...) being disposed around one Fresnel lens (1) so that each side of said one Fresnel lens (1) positioned in the center of said lens system adjoins one side of each of the respective surrounding Fresnel lenses (1, 1 ...), in a concentric-circular relationship wherein (n) stands for a natural number; said sun beam receiving system having a plurality of sun beam focusing members (2, 2 ...) spaced from and rearward of said lens system, each of said sun beam focusing members (2) respectively corresponds to one of said Fresnel lenses (1), with said lens system and said receiving system being integrated with each other; a transparent spherical capsule (13), in which said lens system together with said receiving system are hermetically sealed, said lens system together with said receiving system being turnably mounted around a vertical axis and a horizontal axis (7 and 11), said axes perpendicularly intersecting each other at the centroid of said integrated lens and receiving systems; and means for causing said lens system to track the movement of the sun.

2. A solar optical energy collector as claimed in claim 1, in which said transparent spherical capsule (13) is formed of a plastic material divided along a horizontal plane (13a, 13b) passing substantially through the center thereof.

3. A solar optical energy collector as claimed in claim 2, in which said centroid of said lens system together with said receiving system is positioned substantially at the center of said spherical capsule (13).

4. A solar optical energy collector comprising a lens system for concentrating sun beams and a sun beam receiving system for introducing said sun beams into an optical-conductor cable, said lens system having a plurality (N) of Fresnel lenses (1, 1 ...) each formed in the shape of a hexagon, with $N = 3n(n+1)$ Fresnel lenses (1, 1 ...) disposed around one Fresnel lens (1) so that each side of said one Fresnel lens (1) positioned in the center of said lens system adjoins one side of each of the respective surrounding Fresnel lenses (1, 1 ...), in a concentric-circular relationship, wherein (n) stands for a natural number; said sun beam receiving system having a plurality of sun beam focusing members (2, 2 ...) spaced from and rearward of said lens system, each of said sun beam focusing members (2) respectively corresponds to one of said Fresnel lenses (1), with said lens system and said receiving system being integrated with each other; a transparent spherical capsule (13) formed of a plastic material divided along a horizontal plane (13a,13b) passing substantially through the center thereof, said lens system together with said receiving system being hermetically sealed in said spherical capsule (13) and turnably mounted around a vertical axis and a horizontal axis (7 and 11), said axes perpendicularly intersecting each other at the centroid of said integrated lens system and receiving system, with said centroid positioned substantially at the center of said spherical capsule.

* * * * *